United States Patent Office 3,453,254
Patented July 1, 1969

3,453,254
REACTION PRODUCTS OF STABILIZED ROSIN AMINE AND ORGANIC ACID PHOSPHATE ESTERS
Kurt J. Wasserman, Wanaque, N.J., assignor to Wasco Laboratories, Inc., Vernon, N.J., a corporation of New Jersey
No Drawing. Filed Oct. 14, 1966, Ser. No. 587,384
The portion of the term of the patent subsequent to Dec. 27, 1983, has been disclaimed
Int. Cl. C08h 11/04
U.S. Cl. 260—100           3 Claims

ABSTRACT OF THE DISCLOSURE

Resinous products of the reaction of stabilized rosin amine, such as a dehydroabietyl amine, with mono- and diesters of condensates of alkyl alcohols, such as lauryl alcohol with ethylene oxide and phosphoric acid, are useful as rust and corrosion inhibitors, antistatic agents, bactericidal and fungicidal agents, gelling agents for solvents and oils, and both solvent and aqueous based coatings.

---

The present invention relates to resinous reaction products formed by combining stabilized rosin amine with mono- and diesters of condensates of alkyl alcohols with ethylene oxide and phosphoric acid. In accordance with this invention, it has been discovered that such reaction products have many useful applications as rust inhibitors, antistatic agents, bactericidal and fungicidal agents, gelling agents for solvents and oils, anticorrosion additives, and coatings, both solvent and aqueous based.

The organic acid phosphate esters used in connection with practicing this invention may have two basic structures, namely, monoesters and diesters, as shown below:

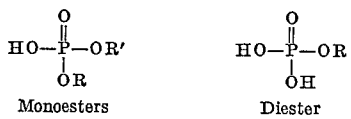

| Monoesters | Diester |

The R and R' groups may consist of condensates of primary or secondary alkyl alcohol with ethylene oxide, having from 1 to 24 carbon atoms in the alkyl chain and from 1 to 40 units of ethylene oxide in the polyoxyethylene chain. In actual application, mixtures of mono- and diesters are most frequently used. The R and R' groups of a diester may be similar or dissimilar.

Also included among the acid phosphate esters are those monoesters which have been partially neutralized with an alkali metal or an organic amine. The structural formula for such a monoester is:

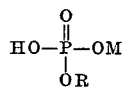

where M may be an alkali metal, such as potassium and sodium or an organic amine, such as methyl amine and monoethanolamine. The stabilized rosin amine in accordance with this invention consists of primary amines derived from various rosins and rosin acids by conversion of the carboxylic acid groups to primary amino groups. These rosin amines include: derivatives of gum and wood rosin containing chiefly abietyl amine; derivatives of hydrogenated rosin containing chiefly dihydro- and tetrahydroabietyl amines; derivatives of heat treated rosin; derivatives of polymerized rosin; derivatives of summarized rosin containing substantial amounts of abietyl amine; and derivatives of pure rosin acids, namely abietylamine, dehydroabietyl amine and tetrahydroabietyl amine.

Acid salts of stabilized rosin amine described above may be employed in place of the stabilized rosin amine. In this case, the neutralizing acid is weaker than the acid phosphate reactant and is, therefore, liberated during reaction. For example, if the acetic acid salt of stabilized rosin amine is reacted with an acid phosphate ester, acetic acid is liberated and the phosphate ester salt is formed.

The reaction between acid phosphate esters and stabilized rosin amine can be carried out readily in an inert solvent, such as benzene or mineral spirits, or by the fusion method consisting of blending the undiluted reactants. An example of a reaction and the product obtained is given below:

To a reaction flask fitted with an agitator, condenser and dropping funnel were added 100 grams of a 10% solution of technical grade dehydroabietyl amine in methyl ethyl ketone, and 100 grams of a 10% solution of a monoester of phosphoric acid and a condensate of lauryl alcohol with 4 moles of ethylene oxide. A precipitate was formed which upon evaporation of the methyl ethyl ketone formed a resinous material with tenacious adhesion to glass and a softening point of 92° C.

Reaction products may be obtained by using proper mole quantities for complete reaction, by using excess amounts of rosin amine, or by using excess amounts of organic acid phosphates. By varying the reactant ratios a number of end products having specific melting points and compatibilities may be obtained. Also mixtures of various organic acid phosphate may be used, as is often the case in actual application, since commercially available acid phosphates are usually combinations of mono- and diesters. Temperatures and pressures applied while carrying out the reaction are not critical and may be varied from 0° C. to 150° C. and from 1 atmosphere to 200 atmospheres, respectively.

The reaction products of this invention are of particular interest because of their many useful applications. Tests have shown that ordinary solvents and mineral oils can be converted to thixotropic gels by the addition of from 5 to 10% of the reaction products of stabilized rosin amine and polyoxyethylene nonyl phenol acid phosphates. The viscosity of dichloroethylene and other chlorinated solvents can be raised by this method so that useful paint removing agents may be formulated.

The addition of certain reaction products to mineral oils have produced high viscosity lubricating greases, which show good anti-corrosion properties. The tendency to form thixotropic gels may also be used in the formulation of solvent based polishes, and the solidification of various fuels.

It will be understood that the details and examples hereinbefore set forth are illustrative only, and that the invention, as broadly described and claimed, is in no way limited thereby.

What is claimed is:
1. A resinous product formed by the reaction at a temperature from 0° C. to 150° C. and a pressure of 1 to 200 atmospheres, of a dehydroabietyl amine and an organic phosphate ester selected from the group consisting of an acid phosphate monoester and an acid phosphate diester with the ester moieties consisting of condensates of primary and secondary alkyl alcohols with ethylene oxide, having from 1 to 24 carbon atoms in the alkyl chain and from 1 to 40 units of ethylene oxide in the polyoxyethylene chain.
2. A resinous product formed by the reaction at a temperature from 0° C. to 150° C. and a pressure of 1 to 200 atmospheres, of a dehydroabietyl amine and an acid phosphate monoester of a primary or secondary alkyl alcohol polyoxyethylene condensate with the monoester partially reacted with a base selected from the group con- sisting of potassium hydroxide, sodium hydroxide, methyl amine and monoethanol amine.

3. Resinous products formed by the reaction at a temperature from 0° C. to 150° C. and a pressure of 1 to 200 atmospheres of:
(1) a rosin amine selected from the group consisting of dehydroabietyl amine, dihydroabietyl amine, tetrahydroabietyl amine, polyabietyl amine, and mixtures thereof; and
(2) The monoester and diester reaction products of:
  (a) phosphoric acid, and
  (b) an alcohol consisting of condensates of primary and secondary alkyl alcohols with ethylene oxide, having from 1 to 24 carbon atoms in the alkyl chain and from 1 to 40 ethylene oxide units in the polyoxyethylene chain.

References Cited

UNITED STATES PATENTS 3,294,775  12/1966  Wasserman _____ 260—100

HOSEA E. TAYLOR, Jr., *Primary Examiner.*

WILLIAM E. PARKER, *Assistant Examiner.*

U.S. Cl. X.R.

106—16; 252—390, 394, 401; 260—105; 424—211, 224